May 15, 1956     P. CRAWFORD, JR     2,745,532

CODE TYPING MEANS

Filed Sept. 18, 1952     4 Sheets-Sheet 1

INVENTOR.
Perry Crawford, Jr.
BY
Joseph J. Robbins
ATTORNEY

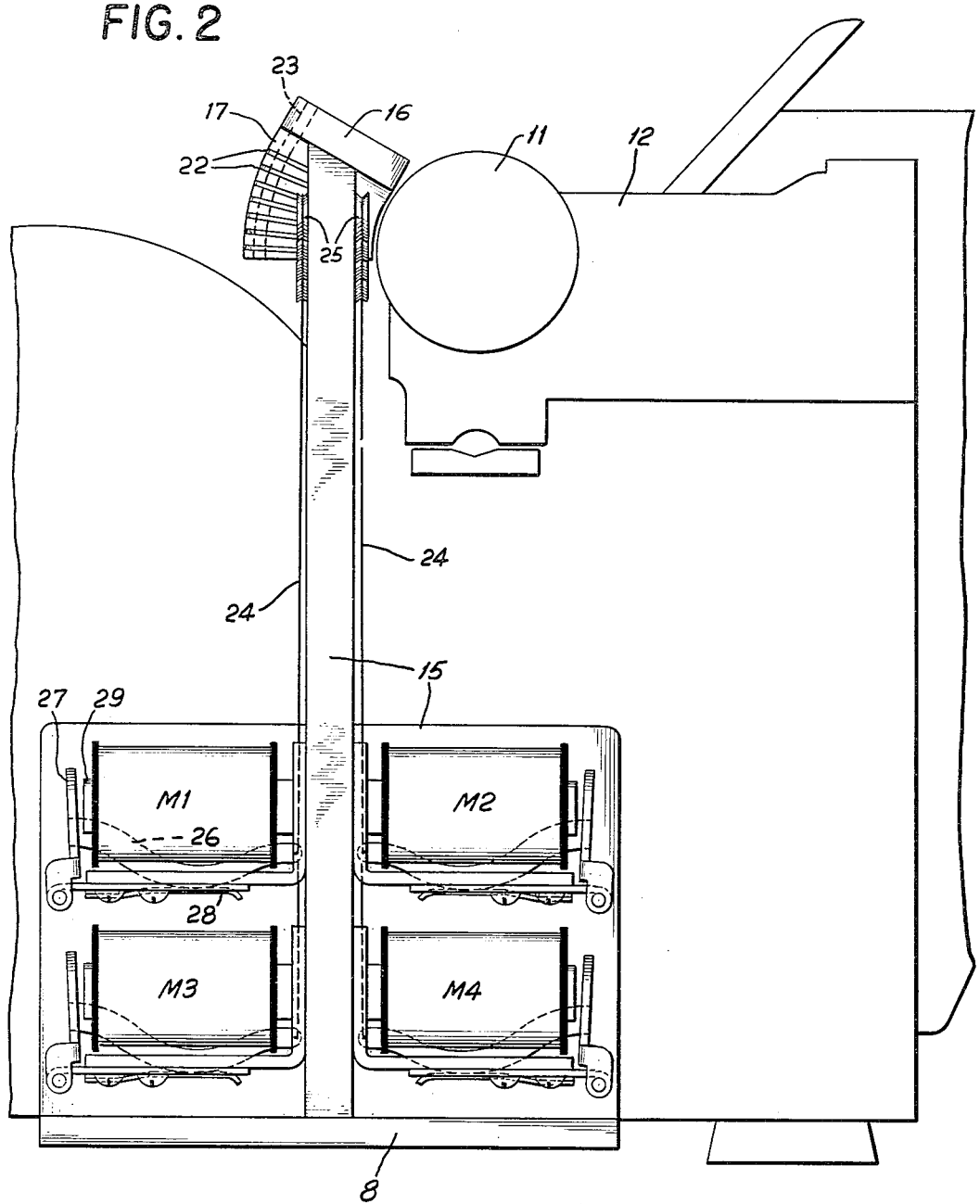

May 15, 1956 P. CRAWFORD, JR 2,745,532
CODE TYPING MEANS
Filed Sept. 18, 1952 4 Sheets-Sheet 3
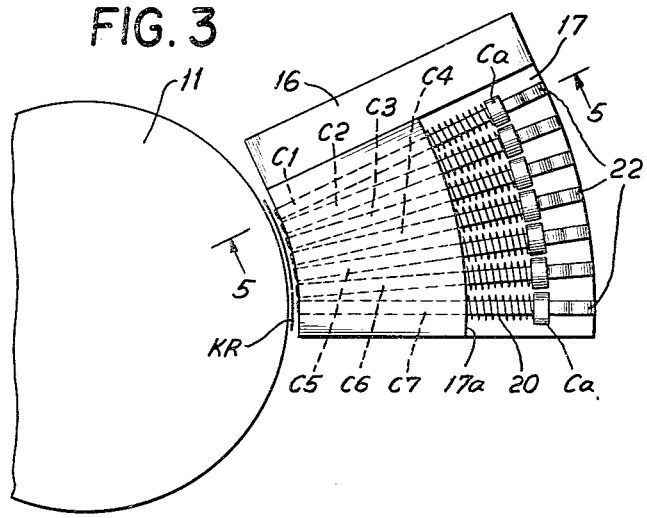
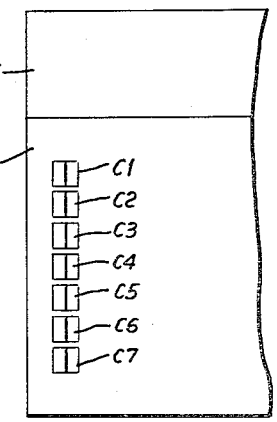
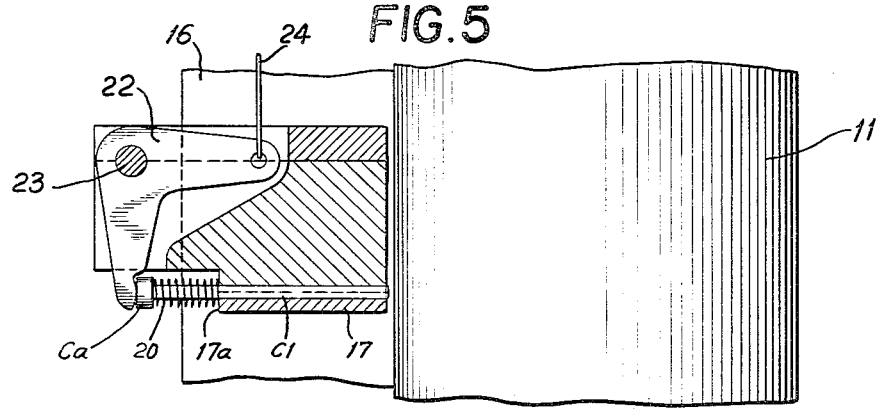
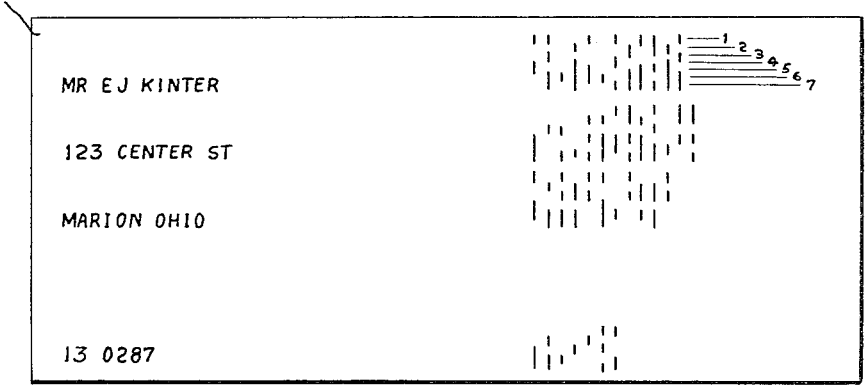
FIG.6
INVENTOR.
Perry Crawford, Jr.
BY Joseph J. Robbins
ATTORNEY

United States Patent Office 2,745,532
Patented May 15, 1956

2,745,532

CODE TYPING MEANS

Perry Crawford, Jr., Great Neck, N. Y., assignor, by mesne assignments, to Underwood Corporation, New York, N. Y., a corporation of Delaware Application September 18, 1952, Serial No. 310,340

13 Claims. (Cl. 197—1)

This invention relates to typing means and has for its general object the provision of novel means for typing data in coded form, preferably at the same time as the data also are being typed in uncoded or conventional form.

In data handling systems using automatic data processing apparatus, the original data are in the conventional form and have to be converted into coded form suitable for automatic machine handling.

An object of the invention is to provide a simple and inexpensive means for placing original uncoded data in typed coded form suitable for machine transcription and utilization. According to the invention, typing means will be provided for producing printed coded representations of data on record means which may be individual work sheets or continuous forms. Further, according to the invention, the code typing means may be combined with or incorporated in a typewriter or the like and may be operated in common with and substantially concurrently with standard means for typing the data in the conventional form, so that the conventional typed data may serve as a direct interpretation of and check on the coded typed data. The records containing the coded typed data may be inserted in a machine for automatically viewing the coded data and automatically registering or storing the data or recording the data on a suitable machine control medium such as a magnetic record tape. The present invention is concerned with the means for typing the data in coded form to be viewed and interpreted in a machine which is not the subject of this invention.

More specifically, an object of the invention is to provide a typewriter or like keyboard machine with auxiliary code typing means selectively functioning under control of the keyboard, so that by the operation of the keyboard in causing the ordinary typing linkages to type a line of conventionally readable data, the code typing means will be brought into operation to type a coded representation of the line of data.

The invention contemplates a novel code mark typing structure which may be combined with or attached to a typewriter or the like to function under control of the keyboard of the typewriter or the like. According to the invention, the code mark typing elements will print through the same ink ribbon and against the same platen as provided for the conventional typing elements.

Another object of the invention is to provide circuitry including electronic devices; specifically, space discharge devices such as thyratrons or the like, for operating code mark typing elements in combinations selected by a conventional typewriter keyboard. According to the invention, during the typing of conventionally readable data, character by character, and the performance of ancillary functions such as intraline spacing, circuits will be selectively rendered effective to operate code mark type elements to print coded representations of the data being typed in conventional form. Preferably, a suitable combinational code will be employed and the conventionally typed data and the codal representation of the data will be printed in laterally spaced fields of the same work sheet.

Other objects of the invention will be apparent from the following detailed description of the apparatus, from the claims, and from the accompanying drawings.

In the drawings:

Fig. 2 is a side view looking at the right of Fig. 1.

Fig. 3 is a detail side view of the code mark typing block and adjacent elements, looking in the direction of the arrow 3 in Fig. 1.

Fig. 4 is a view of the code mark typing block looking toward the code type faces.

Fig. 5 is a section taken along line 5—5 of Fig. 3.

Fig. 6 shows a sample of work done by the apparatus constructed according to the invention.

Figure 1:
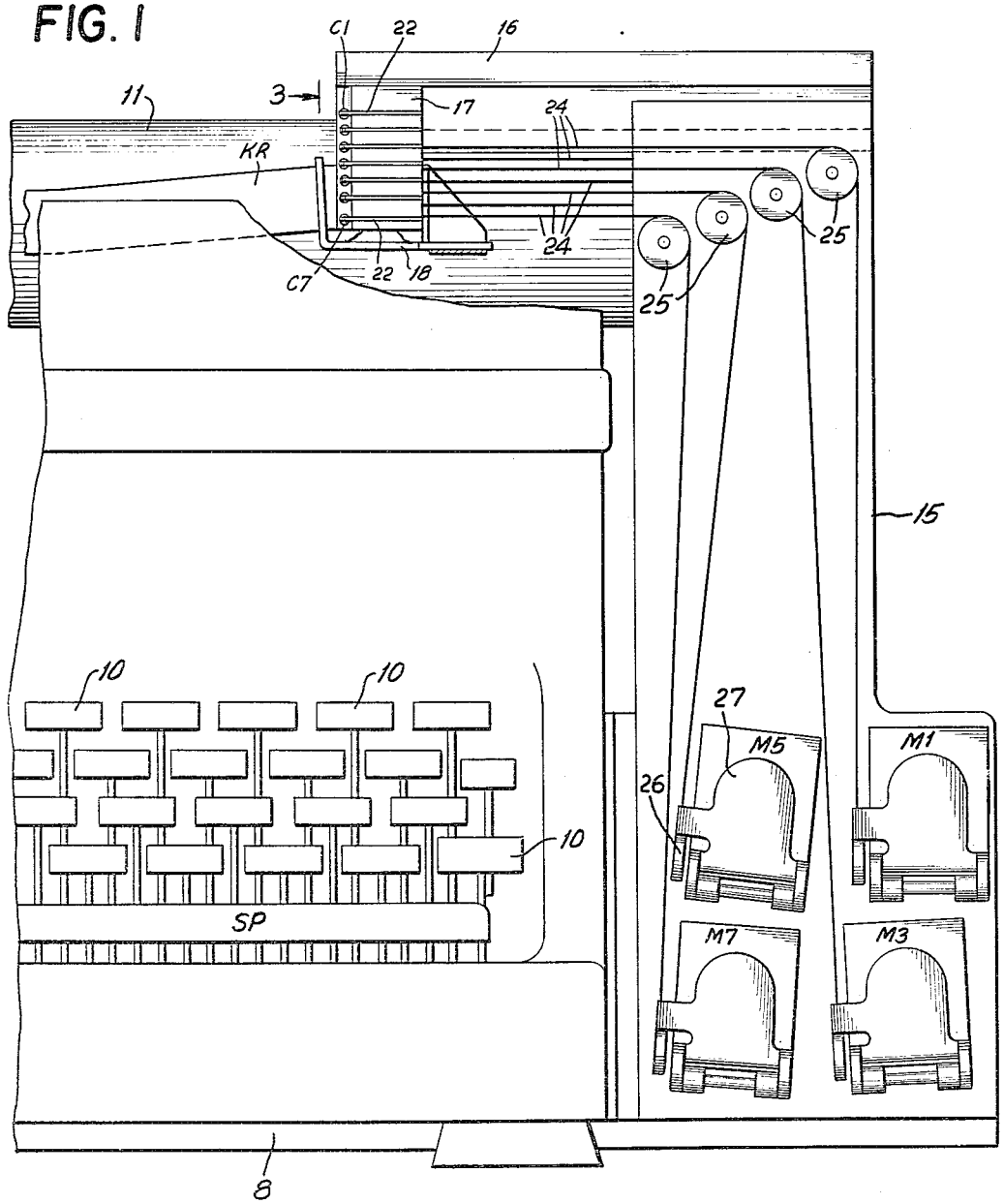
Fig. 1 is a front view of the pertinent portion of an illustrative typewriter and of the attached code mark typing means, with covering parts removed or broken away to show interior parts.

The code typing unit may be operated in combination with or as an auxiliary to any ordinary typewriter. The illustrative typewriter has its base 8 (Figs. 1 and 2) extended to mount the code typing unit. The keyboard of the typewriter has the usual character keys, generally designated 10, and the usual space bar designated SP. Depression of a key 10 will cause the associated type bar (not shown) to type a conventional character, through an ink ribbon KR, on a work sheet supported by the platen 11. Depression of the space bar will cause intraline spacing of the typewriter carriage 12 in the usual manner. In addition to the keys and the space bar performing their regular functions in the typing of conventional data, they severally close switches, generally called key contacts, for controlling the code typing unit, in accordance with the present invention, to type codal representations of the conventional data. The key contacts may be operated directly by the keyboard elements, or may be operated indirectly as in Fig. 9 of Patent No. 2,285,289. It is to be understood that there may be one key contact for each of the keyboard elements. However, for the purposes of the disclosure, it is sufficient to show diagrammatically in the circuit diagram, Fig. 7, a number of the contacts in association with typical keys and with the space bar. A key contact may be identified by the letter "a" and by the keyboard element for operating the contact.

The code typing unit includes a generally vertically disposed frame 15 mounted on the base 8. Rigid with the upper portion of the frame 15 is a cantilever beam 16 extending horizontally in front of the platen 11. At its free end, the beam 16 is provided with a block 17 formed with guide slots receiving seven code mark type elements C–1 to 7 (also see Figs. 3, 4 and 5). The elements C are arranged in a vertical column, with each element extending radially of the platen 11 and with the type faces of the elements in arcuate formation about a small arc of the platen. In the illustrative embodiment, the code mark is a short vertical line and the type faces of elements C for making these marks are in vertical alinement as indicated in Fig. 4. The ink ribbon KR for the conventional character printing is diverted upwardly by a ribbon guide 18 (see Fig. 1), which is preferably carried by block 17, so as to pass between the platen 11 and the type faces of elements C, as shown best in Fig. 3. Thus, when any of the type elements C is impelled toward the platen, it coacts with the platen and the ink ribbon KR to print a code mark on the work sheet (see Fig. 6).

The code mark type elements extend rearwardly past a shoulder 17a of the block 17 and are formed at their rear ends with heads Ca. Coil springs 20 surrounding the elements C between the shoulder 17a and the heads Ca normally hold the elements C in retracted positions. Mounted in the block 17 in transverse alinement with the code mark type elements C are seven bell crank levers 22, one for each element C. Levers 22 are pivoted on a curved pivot pin 23 fixed into the block 17. One end of each lever 22 abuts the head Ca of the alined code mark type element C. The other end of the lever is connected to a pull wire 24. The pull wires 24 of the several levers 22 extend horizontally to guide sheaves 25 rotatably supported by the frame 15 (see Figs. 1 and 2) and are guided by the sheaves in generally vertical directions into points of connection at their lower ends with arms 26 of armature levers 27. The armature levers are associated with seven magnets M1 to M7 (see Figs. 1, 2, and 7). Springs 28 normally maintain the armatures in retracted positions. Upon energization of a magnet M, its armature lever 27 is rocked in a direction to cause the arm 26 of the armature to pull down on the connected wire 24. The wire 24 thereupon rocks the connected lever 22 counter-clockwise, as viewed in Fig. 5, to impel the associated mark type element C toward the platen 11 so as to print a code mark.

The operating means for the type mark elements C are so adjusted that an armature lever 27 strikes the magnet pole face 29 before its associated type mark element C has struck the platen, the momentum having been imparted to type element C being sufficient to cause it to overtravel with respect to its actuating means, so as to strike the platen 11 to effect printing and bounce away before the normal character spacing movement of the platen occurs.

In operation, the typewriter will be set for triple line spacing and the marks made by elements C will be in differentially related positions in columns within the triple line space. The differential positions of the marks within a column determine their codal values. The chosen illustrative code represents characters and ancillary functions, such as intraline spacing, by various combinations of the marks in a column. Fig. 6 shows a sample of work done by the typewriter and the auxiliary code typing unit upon a work sheet WS. The conventional data are typed in a left hand field of the sheet while the corresponding codal representations are concurrently typed in a right hand field. The seven differential codal positions are indicated by the lines designated 1, 2, 3, 4, 5, 6, and 7, but it is to be understood that these lines and their reference designations do not actually appear on the sheet. The codal representations will be scanned and interpreted in another machine.

Figure 7:
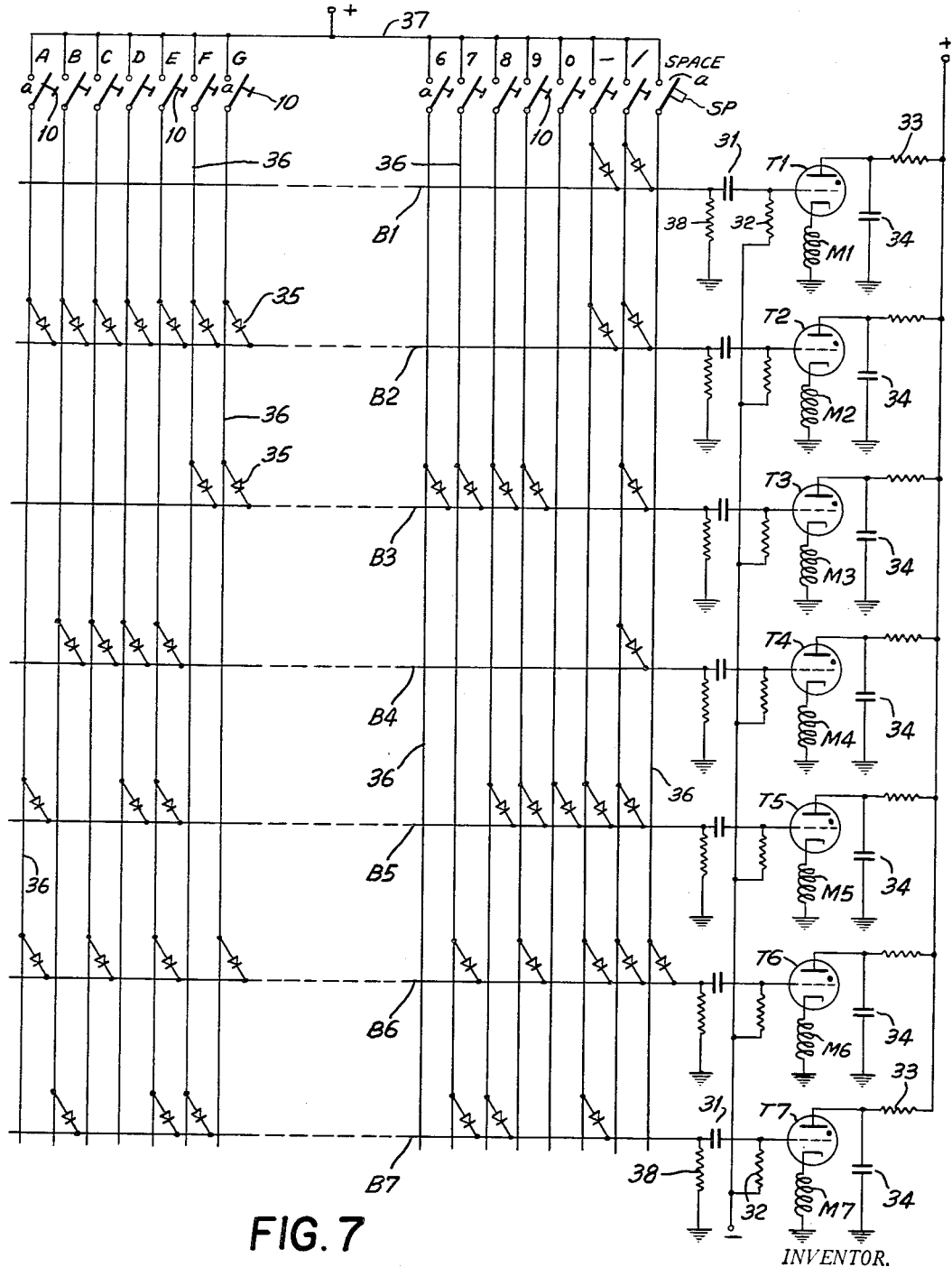
Fig. 7 is a circuit diagram of the apparatus.

Referring to Fig. 7, the circuits of the code typing unit include seven thyratron tubes T1 to T7. The grids of the tubes are severally connected via similar capacitors 31 to buses B1 to B7 and via similar resistors 32 to the negative side of a bias voltage supply. The cathodes of the tubes T1 to T7 are respectively in series with the magnets M1 to M7, of which all but M6 are in view in Figs. 1 and 2. The tube anodes are wired via similar resistors 33 to the positive side of a voltage source. In parallel circuit with each tube and serially connected magnet is a capacitor 34. The buses B1 to B7 are variously connected via rectifiers 35 to lines 36 each wired to one side of a different key contact a. The key contacts are wired at the opposite sides to a positive voltage line 37. The connections between the lines 36 and the buses B are made in accordance with the requirements of the chosen code. For example, an intraline space is denoted by a code mark in differential position 6; hence contact a of the space bar SP is connected to the bus B6. As another example, the letter C is denoted by code marks in differential positions 2, 4 and 6; hence the contact a of key 10–C is connected to buses B2, 4 and 6.

The grids of the tubes T are normally biased sufficiently negative to block ionization of the tubes. During the deionized period of a tube, the parallel capacitor 34 charges essentially to the plate supply potential of the tube. Upon the closure of a key contact, a circuit is established from line 37 via the key contact, the connected line 36, a rectifier 35 to the bus B, and thence via a capacitor 31 and resistor 32 to the negative terminal of the bias supply. The resulting triggering pulse entirely overcomes the negative grid bias of the tube and the tube ionizes and begins to conduct. The parallel capacitor 34 which has been charged up before the arrival of the triggering pulse now rapidly discharges a large current pulse through the tube and the serially connected magnet M. The magnet becomes energized and causes the related code mark type element C to operate for printing a code mark on the work sheet.

The capacitor 31 acts as a D. C. block to prevent the tube T from remaining conductive upon continued depression of a key or the space bar and attendant maintained closure of the key contact. The capacitor 31, further, performs a differentiation on the grid input pulse produced by closure of a key contact and transmits a triggering pulse of short enough duration to assure that an effective pulse potential will not be present at the time the tube is to deionize. After the triggering pulse has died down and the discharge current through the tube drops below the extinction current value of the tube, it stops conducting and the current pulse through the connected magnet M ends. The value of resistor 33 is chosen high enough so that the capacitor cannot charge up rapidly enough to prevent deionization of the tube. When the tube stops conducting, the grid bias recovers control and the capacitor 34 recharges. Meanwhile, any charge remaining in the coupling capacitor 31 leaks off to ground through a resistor 38.

As a specific example, assume the key 10–C is depressed. The depression of the key results in the typing of the character C followed by the usual character spacing. As the key is depressed, it closes its key contact a, applying potential via a line 36 and rectifiers 35 to buses B2, 4 and 6, so that triggering pulses are applied via the connected capacitors 31 and resistors 30 to the tubes T2, 4 and 6. Consequently, the capacitors 34 paralleling these tubes discharge current pulses through the tubes for energizing magnets M2, 4 and 6. Energization of these magnets causes the type elements C2, 4 and 6 (Figs. 3 and 4) to type code marks in positions 2, 4 and 6 of a column, these marks being the codal representation of the character C. The electronic circuitry described and shown herein operates with great rapidity so that the typing of codal representation of a character takes place substantially concurrently with the typing of the conventional character and before the character spacing occurs. In the case of the intraline space function controlled by space bar SP, the code typing means operates rapidly enough to print the codal representation of this function before the intraline spacing commences.

While there has been shown and described and pointed out the fundamental novel features of the invention as applied to a single embodiment, it will be understood that various omissions and substitutions and changes in the form and details of the device illustrated may be made by those skilled in the art without departing from the spirit of the invention. It is intended, therefore, to be limited only as indicated by the following claims.

What is claimed is:

1. The combination with a typewriter or the like having key elements operable one at a time to control the printing of data character by character in uncoded form; of an auxiliary code typing means for typing coded representations of the data, said means including a set of differentially disposed code mark type elements for typing codal representations of said data, one representation after another, in successive areas of a work sheet positioned between the platen of said typewriter and said type elements, a plurality of control means one for each of said type elements, actuating means for each of said type elements connected by movable means to each of said control means and effective upon energization of said control means for actuating said type elements, each of said type elements upon operation printing a code mark in a differential position of such area, the differential position of the typed code mark determining its codal significance, and energizing means operated under control of said key elements for energizing said control means in various combinations determined by a combinational code of data representation so as to type codal representations of the data concurrently with the printing of the data in uncoded form.

2. The combination with a typewriter or the like having key elements operable one at a time to control the typing of data, character by character, in uncoded form in spaced lines within a field of a work sheet supported by a platen; of a code typing means, said means including a set of code mark types for coacting with the aforesaid platen to type codal representations of each line of the data, one representation after another, in successive areas of another field of said work sheet, a plurality of control means one for each of said mark types, actuating levers for each of said mark types connected by pull wires to each of said control means and effective upon energization of said control means for actuating said mark types, each of the code mark types upon operation typing a code mark in a differential position of such area, the differential position of the typed code mark determining its codal significance, and energizing circuits operated under control of said key elements for energizing said control means in various combinations determined by a combinational code of data representation so as to type code mark representations of said data concurrently with the typing of the data in uncoded form.

3. The combination set forth in claim 2, said set of code mark types being arranged in a single vertical column with their type faces in arcuate formation about an arc of said platen, and means for mounting the code mark types for individual radially slidable movement into typing coaction with said platen.

4. The combination set forth in claim 3, the typing of the data in uncoded form and in coded form being effected through a common ink ribbon, the set of code mark types being vertically offset relative to the uncoded character typing position, and a ribbon guide for diverting the ink ribbon from said typing position into a path between the code mark types and the platen.

5. The combination with a typewriter or the like having keys operable one at a time to control printing of data character by character in uncoded form upon a work sheet supported by a platen; of a code typing unit to type combinational codal representations of the data, one representation after another, in successive areas of said work sheet, said unit including key contacts closed under control of said keys, a set of differentially positioned type elements for printing similar marks in differential positions of a said area, the differential position of a mark determining its codal significance, magnets for operating said type elements selectively, and circuits controlled by closure of said key contacts for energizing said magnets in various combinations determined by a combinational code of character data representation so as to operate said type elements in similar combinations for typing codal representations of data in said areas concurrently with the character by character printing of the data in uncoded form.

6. The invention according to claim 5, said code typing unit including a framework carried by the frame of the typewriter or like device, said framework including a member extending parallel to said platen and provided with a block for mounting said code mark type elements with their type faces confronting said platen in a single vertical line, said type elements being mounted on the block for individual movement toward the platen into mark typing coaction therewith.

7. The invention according to claim 5, said code typing unit including a framework supported by the frame of the typewriter or like device, said framework having a vertical leg at one side of the typewriter or like device and a beam extending horizontally from said leg in cantilever fashion and provided at its free end with a block in front of said platen for mounting said code mark type elements with their type faces in arcuate formation about an arc of said platen, said mark type elements being individually slidably mounted in the block for substantially radial movement toward said platen to effect typing coaction therewith.

8. A codal data typing unit including a set of differentially positioned code mark type elements, a platen, a frame for slidably individually mounting said type elements for substantially radially slidable movement toward said platen to print code marks on a work sheet between said platen and said type elements, actuating levers, one for each type element, carried by said frame, pull wires, each connected to one of said levers, devices for individually pulling said wires to effect actuation of the connected levers and, thereby, of said associated type elements, data selecting agencies, and means controlled by said agencies for operating said devices selectively in accordance with a chosen code of data representation.

9. The invention according to claim 8, said levers being movable in one direction and said devices being movable in a different direction, and guide sheaves mounted on said frame over which said pull wires pass and by which said wires are guided toward said levers in one direction and toward said devices in a different direction.

10. A codal data typing unit comprising a set of individual code mark type elements operable in various combinations to print code mark representations of data, magnets one for each type element, an operative connection between each magnet and the related type element effective upon energization of said magnet for driving said related type element through a typing stroke, circuits for selectively energizing said magnets and including a plurality of normally non-conducting gaseous discharge tubes each in series circuit with a different one of said magnets, and data selecting means for triggering said tubes selectively to conducting state so as to selectively energize said serially connected magnets in accordance with a combinational code of data representation.

11. The invention according to claim 10, said tubes each including a control grid, means normally biasing said grids to maintain said tubes deionized, a capacitor in parallel circuit with each tube and said serially connected magnet and charged during the deionized period of said tube and effective upon triggering of said tube to discharge a current pulse through said tube and serially connected magnet so as to produce momentary energization of said magnet, said data selecting means being selectively coupled to said control grids in accordance with said code so as to apply triggering pulses to the grids of selected tubes for overcoming their bias and enabling them to conduct.

12. The combination with a typewriter or the like having keys operable one at a time to control the printing of data in conventional form; of a code typing unit for typing codal representations of said data, said unit including key contacts selectively actuated under control of said typewriter keys, a set of code mark type elements, a corresponding set of electromagnets, an operative connection between each one of said electromagnets and a corresponding one of said code mark type elements and effective upon energization of said electromagnet for actuating said corresponding type element to type a code mark, energizing circuits for said electromagnets, and a matrix of combinational circuit connections between said key contacts and said energizing circuits for establishing one or more of the circuits in accordance with a combinational code of data representation, so that a codal representation of the data will be typed by said code mark type elements concurrently with the printing of the data in conventional form.

13. The combination with a typewriter or the like having elements operable to control the printing of data in conventional form; of a code typing unit for typing coded representations of the data, said unit including switches each closed under control of and upon operation of a different one of said elements, a set of differentially positioned code mark type elements, a plurality of electromagnets one for each type element, an operative connection between each electromagnet and the related type element and effective upon energization of said electromagnet for actuating said related type element to type a differentially positioned code mark in an area of a work sheet, the differential position of the code mark determining its codal significance, and circuits rendered effective in various combinations upon closure of said switches for energizing said magnets selectively to produce operation of said mark type elements in typing combinational codal representations of the data concurrently with the printing of the data in conventional form, each said switch being connected into one or more of said circuits in accordance with a chosen code of combinational data representation.

References Cited in the file of this patent

UNITED STATES PATENTS

| | | |
|---|---|---|
| 422,614 | Nolan | Mar. 4, 1890 |
| 2,114,296 | Green | Apr. 19, 1938 |
| 2,299,107 | Potts | Oct. 20, 1942 |
| 2,400,949 | Pitman | May 28, 1946 |

FOREIGN PATENTS

| | | |
|---|---|---|
| 523,698 | Germany | Aug. 21, 1933 |
| 537,343 | Great Britain | June 18, 1941 |